United States Patent
Arocho et al.

(10) Patent No.: US 11,163,805 B2
(45) Date of Patent: Nov. 2, 2021

(54) METHODS, SYSTEMS, ARTICLES OF MANUFACTURE, AND APPARATUS TO MAP CLIENT SPECIFICATIONS WITH STANDARDIZED CHARACTERISTICS

(71) Applicant: The Nielsen Company (US), LLC, New York, NY (US)

(72) Inventors: Cesar Arocho, Chicago, IL (US); Jonathan Sullivan, Hurricane, UT (US); Michael D. Morgan, Bartlett, IL (US); Andrew Stannard, Thornhill (CA); Kali Bogovich, Chicago, IL (US); Calvin James Bissett, Newmarket (CA); Logan Thomas, Round Rock, TX (US)

(73) Assignee: The Nielsen Company (US), LLC, New York, NY (US)

( * ) Notice: Subject to any disclaimer, the term of this patent is extended or adjusted under 35 U.S.C. 154(b) by 136 days.

(21) Appl. No.: 16/694,623

(22) Filed: Nov. 25, 2019

(65) Prior Publication Data
US 2021/0157825 A1    May 27, 2021

(51) Int. Cl.
*G06F 16/28* (2019.01)
*G06F 16/25* (2019.01)
(Continued)

(52) U.S. Cl.
CPC ...... *G06F 16/285* (2019.01); *G06F 16/24578* (2019.01); *G06F 16/258* (2019.01); *G06F 16/9024* (2019.01); *G06Q 30/0201* (2013.01)

(58) Field of Classification Search
CPC .. G06Q 30/0201; G06F 16/338; G06F 16/254
See application file for complete search history.

(56) References Cited

U.S. PATENT DOCUMENTS 6,654,731 B1    11/2003  Mahesh
8,583,648 B1    11/2013  Majkowska
(Continued)

FOREIGN PATENT DOCUMENTS

KR    20110110683    10/2011

OTHER PUBLICATIONS

Wang et al., "Adaptive Affinity Propagation Clustering," Adaptive Affinity Propagation Clustering. Acta Automatica Sinica, 33(12), 2007, pp. 1242-1246, 6 pages.
Wikipedia, "Affinity Propagation," last revised on Dec. 10, 2019, 3 pages.
(Continued)

*Primary Examiner* — Hau H Hoang
(74) *Attorney, Agent, or Firm* — Hanley, Flight & Zimmerman, LLC

(57) ABSTRACT

Methods, systems, articles of manufacture, and apparatus are disclosed to map client specifications to standardized characteristics. An example apparatus includes a cluster identifier to cluster client databases into client clusters based on a threshold quantity of overlapping universal product codes (UPCs) between respective ones of the client databases, a characteristic analyzer to identify custom characteristics from the respective ones of the client clusters, ones of the custom characteristics having dissimilar nomenclature, and a graph builder to cluster the ones of the custom characteristics based on a similarity metric, and normalize the ones of the custom characteristics as a proxy characteristic, the proxy characteristic having a common nomenclature to represent the ones of the custom characteristics, the characteristic analyzer to enable improved product marketing analysis by replacing dissimilar nomenclature with the proxy characteristic.

27 Claims, 9 Drawing Sheets

(51) Int. Cl.
*G06Q 30/02* (2012.01)
*G06F 16/2457* (2019.01)
*G06F 16/901* (2019.01)

(56) References Cited

U.S. PATENT DOCUMENTS

| | | |
|---|---|---|
| 8,620,919 B2 | 12/2013 | Gates et al. |
| 2008/0208671 A1 | 8/2008 | Ehrlich et al. |
| 2011/0213784 A1 | 9/2011 | Udupa et al. |
| 2012/0284269 A1 | 11/2012 | Parunak et al. |
| 2012/0303412 A1 | 11/2012 | Etzioni et al. |
| 2018/0293294 A1 | 10/2018 | Huang et al. |
| 2019/0057430 A1 | 2/2019 | Zhu et al. |

OTHER PUBLICATIONS

Blondel et al., "Fast unfolding of communities in large networks," retrieved from [https://arxiv.org/abs/0803.0476v2], Jul. 25, 2008, 12 pages.
Wikipedia, "Jaccard Index," last revised on Feb. 7, 2020, 9 pages.
Wikipedia, "Matching (graph theory)," last revised on Feb. 5, 2020, 9 pages.
Nandi, "Social network analysis with Networkx," Data Science Blog by Domino, [https://blog.dominodatalab.com/social-network-analysis-with-networkx/], 19 pages.
Wikipedia, "tf-idf," last revised Feb. 20, 2020, 6 pages.
International Searching Authority, "Written Opinion," issued in connection with International Patent Application No. PCT/US2020/061316, dated Mar. 11, 2021, 4 pages.
International Searching Authority, "Search Opinion," issued in connection with International Patent Application No. PCT/US2020/061316, dated Mar. 11, 2021, 4 pages.

METHODS, SYSTEMS, ARTICLES OF MANUFACTURE, AND APPARATUS TO MAP CLIENT SPECIFICATIONS WITH STANDARDIZED CHARACTERISTICS

FIELD OF THE DISCLOSURE

This disclosure relates generally to characteristics normalization and, more particularly, to methods, systems, articles of manufacture, and apparatus to map client specifications with standardized characteristics.

BACKGROUND

In recent years, cloud-based platforms have been combining data, analytics, and role-based applications to deliver actionable insights to manufacturers and retailers. Onboarding a client to have the proper architecture to function within the cloud-based platforms typically requires mapping custom client specifications with previously entered characteristics.

Figure 1:
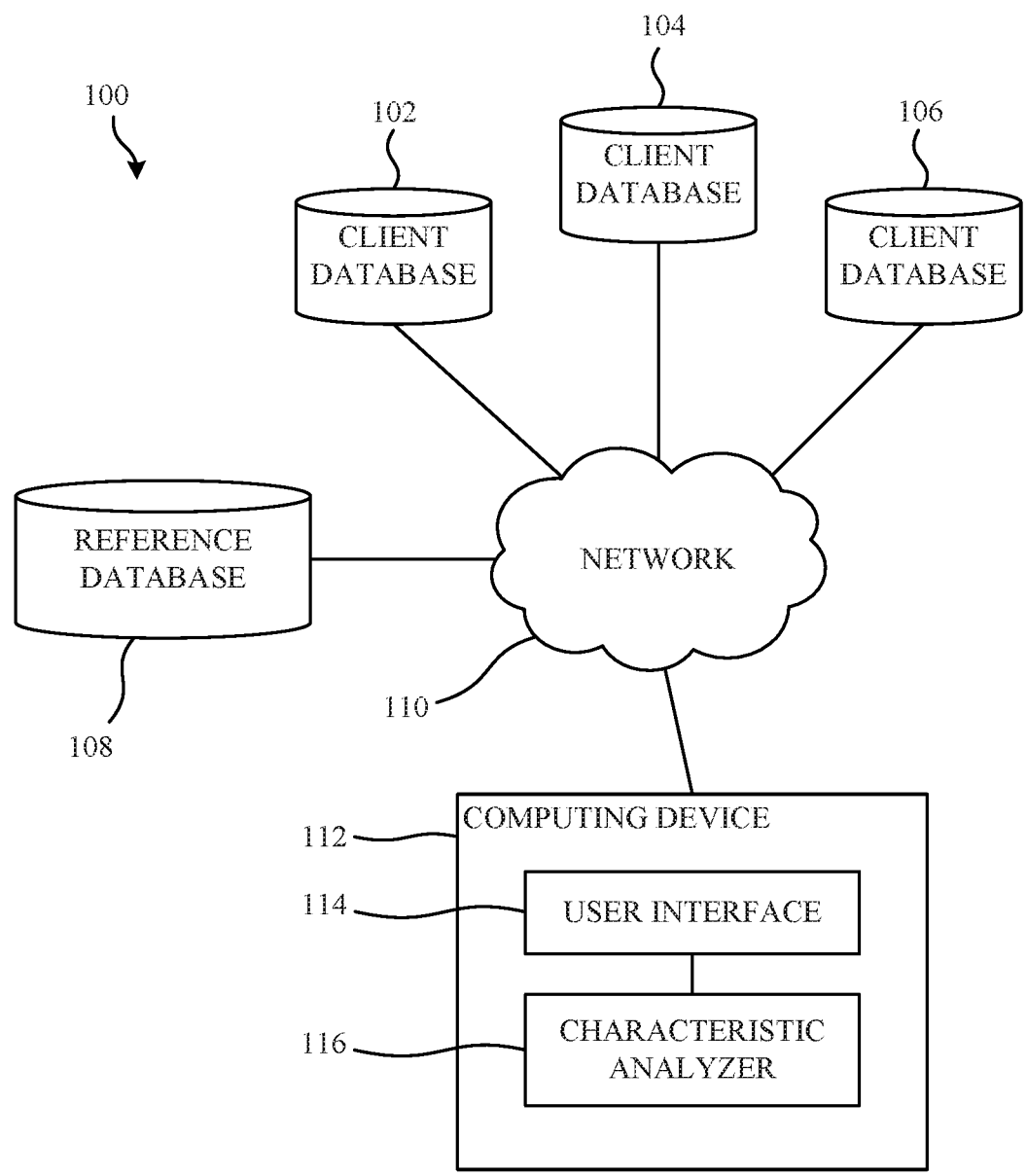
FIG. 1 illustrates an example custom specifications mapping system.

The figures are not to scale. In general, the same reference numbers will be used throughout the drawing(s) and accompanying written description to refer to the same or like parts. Connecting lines or connectors shown in the various figures presented are intended to represent example functional relationships and/or physical or logical couplings between the various elements.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In recent years, the need for data and analytics has risen in the retail and/or manufacturing realm due to fast-paced markets and increased competition. Market data and analytics can deliver actionable insights for a company and provide better knowledge as to how that company pairs up against competitors and similar markets. Cloud-based platforms (e.g., systems) can be used as a central hub, for retailers and manufacturers, and provide an easy way for them to onboard their products to be characterized and analyzed against real-time market data.

The real-time market data can include anything from measuring sales performances of retail companies to measuring the consumption of programming and advertising across all distribution points. From there, client analysis is performed, and insights are generated specifically for clients to improve their spending and efficiency of advertisement effort, increase the impact of their promotion budgets and/or optimize their product assortments. These insights may also provide sales predictions based on the changes in a client's offerings, pricings, and/or marketing.

As used herein, a "client specification" (sometimes referred to as a "specification") represents any number of products corresponding to a retail store or online store, in which each product includes corresponding descriptive characteristics. In some examples, the client specification includes Universal Product Codes (UPCs) (e.g., a graphic code that represents a specific product, in which the graphic is typically placed (e.g., printed) on the product being sold at a retailer facility (e.g., a retail store, a web-based store, etc.)), custom characteristics (e.g., size, flavor, weight, quantity, etc.), and/or product descriptions (e.g., names, etc.), etc. To onboard (as used herein, "onboarding" is the process of bringing a specific client's products into data storage associated with a cloud-based system) a client (e.g., a new client) into the cloud-based system, the client specification information must be mapped to existing characteristics within the cloud-based system. For example, a new client may have any number of products that are to be incorporated into the cloud-based system (e.g., a cloud-based marketing analytics system) so that analysis activities can occur between the client's products and one or more competitors. For instance, the new client may be a retail store having an adult dog food product, in which the retail store associates particular characteristics with the adult dog food product that are different than a competing retail store. While the adult dog food products in the new client's retail store and the competing retail store are substantially the same, characteristics of one may include "adult dog," while characteristics of the other may include "mature canine." Accordingly, before such marketing analytics can be performed, these two example products (e.g., having a same UPC in some instances) must be identified as equals and/or otherwise substantially similar to each other. However, such onboarding activities/tasks are very time-consuming and costly because it is typically done by individually coding each product into the cloud-based platform. These tasks are tedious, subject to personnel discretion, and often lead to complex and unstandardized characteristics and/or unstandardized characteristic nomenclature.

In examples disclosed herein, the custom specifications mapping system creates a set of "proxy characteristics" that correspond to a client specification. The example proxy characteristics include a standardized set of values (e.g., dictionary values) that are granular enough to use as building blocks when onboarding clients and their respective specifications. The example custom specifications mapping system also creates a set of mapping instructions for a client's custom specification. The example custom specifications mapping system also includes a process (e.g., automated process) to map a client's custom specification to each of the proxy characteristics and dictionary values to reduce time and cost of the client onboarding process.

The example custom specifications mapping system identifies client specifications that are related to one another and clusters them together to facilitate further market analysis effort(s). As used herein, clusters represent client groupings having a degree of similarity, and are a way in which the example custom specifications mapping system aggregates related manufacturers and retailers into a single system to facilitate analysis of the client specification content in view of other market participants (e.g., retailers) that use different product nomenclature for the same or substantially similar products. Client specifications may be accessed from client databases and clustered together based on similarity scores.

The example custom specifications mapping system disclosed herein analyzes the custom characteristics of each individual client database found within a client cluster to group (as used herein, the terms "group" and "cluster" are used interchangeably) these characteristics into one or more concept clusters. For example, a first client database (e.g., from a first client) may have a custom characteristic named "product size" with the custom characteristic values (e.g., sub characteristic) of "small", "medium", and "large", while a second client database (e.g., from a second client) may have a custom characteristic named "size" with the custom characteristic values of "S", "M", and "L". These two example custom characteristics may be grouped together into a (unified) concept cluster pertaining to an aggregated size concept. The aggregated size concept is sometimes referred to as a "proxy characteristic" or a "normalized characteristic" that represents one or more of the differently named custom characteristics and their corresponding values (e.g., sub characteristics).

In examples disclosed herein, the custom specifications mapping system defines a standardized dictionary of values for the concept clusters. Within each concept cluster (e.g., "size"), sub-clusters (e.g., "S," "M," "L") are determined from UPC overlap between each custom characteristic value within the concept cluster and ranked to determine a standardized dictionary of values corresponding to that individual concept cluster. In some examples, UPC overlap (matches) occurs when the same UPC (e.g., products that have a same bar code) appears in two separate client databases having, for instance, differently named custom characteristics (e.g., "product size" versus "item size"), differently named custom characteristic values (e.g., "small" versus "S"), etc. In such examples, the overlapping UPCs often have different nomenclature describing the same UPC (e.g., "product size" and "size"). In some examples, the custom specifications mapping system uses the Term Frequency-Inverse Document Frequency (TFIDF) technique to rank the most important keywords with respect to each sub-cluster. In some examples, a chi-squared statistic method is used to map each keyword to the most relevant sub-cluster.

In examples disclosed herein, the custom specifications mapping system attaches dictionary values to products already defined within the cloud-based platform. Cloud-based platform custom characteristics and values are leveraged to compile the final dictionary values for products. Leveraging the cloud-based platform custom characteristics ensures that the final output, or final dictionary values, are based on trusted characteristics and values rather than custom client specifications or discretionary input from analyst personnel.

In examples disclosed herein, the cloud-based platform is represented as a One Global Reference Data System (OGRDS), and/or, more generally, a reference database. The OGRDS is a solution space where client products (e.g., UPCs, product definitions, etc.) are stored, analyzed, and later compared with other products. Using the OGRDS and custom client specifications, a machine learning model can be trained to learn relationships between the pre-existing products and the client products being onboarded to the OGRDS. For example, the machine learning model can build a decision tree from the learned relationships and use the decision tree to populate products in a faster and more efficient manner.

In the illustrated example of FIG. 1, a custom specifications mapping system 100 includes example client databases 102, 104, 106, an example reference database 108, an example network 110, an example computing device 112, an example user interface 114, and an example characteristic analyzer 116.

In the illustrated example of FIG. 1, the respective client databases 102, 104, 106 include all products for associated individual clients (e.g. different retail chains). For example, the client databases 102, 104, 106 can include a client specification that contains UPCs, custom characteristics, product (e.g., UPC) definitions, etc.

In the illustrated example of FIG. 1, the reference database 108 stores standardized UPCs that have already been characterized and contain UPC definitions. In some examples, the reference database 108 can be implemented as a One Global Reference Data System (OGRDS) to store items, such as OGRDS concept definitions. In such examples, the OGRDS concept definitions are UPC definitions that contain specific OGRDS characteristics which can include a plurality of items (e.g., ingredients, quantities, colors, etc.) that further describe each UPC within the OGRDS.

In the illustrated example of FIG. 1, network 110 facilitates communication between the client databases 102, 104, 106, the reference database 108, and/or the computing device 112. In some examples, any number of client devices 102, 104, 106 can be communicatively coupled to the reference database 108 and the computing device 112 via the network 110. The communication provided by the network 110 can be via, for example, the Internet, an Ethernet connection, USB cable, etc.

In the illustrated example of FIG. 1, the computing device 112 communicates with the client databases 102, 104, 106 and the reference database 108 through the network 110. In some examples, the computing device 112 contains the user interface 114 and the characteristic analyzer 116. In the illustrated example of FIG. 1, the computing device 112 is a server, but alternatively may be an Internet gateway, a laptop, a cellular phone, a tablet, etc.

In the illustrated example of FIG. 1, the user interface 114 allows one or more users to interact with the computing device 112 and/or the characteristic analyzer 116 of FIG. 1. For example, the user interface 114 allows the user to monitor (e.g., view process, make changes, modify values, etc.) the characteristic analyzer 116. In some examples, the user interface 114 allows to user to modify example values that may not satisfy user-defined criteria.

In the illustrated example of FIG. 1, the characteristic analyzer 116 creates a set of proxy characteristics associated with client database information having a standardized set of values. In some examples, the characteristic analyzer 116 maps a client's specification (e.g., UPCs) to each standardized value within a proxy characteristic. In some examples, the characteristic analyzer 116 builds a decision tree based on OGRDS definitions to map pre-existing UPCs and/or new UPCs to a standardized value. In some examples, the characteristic analyzer 116 is an application-specific integrated circuit (ASIC), and in some examples the characteristic analyzer 116 is a field programmable gate array (FPGA). Alternatively, the characteristic analyzer 116 can be software located in the firmware of the computing device 112.

Figure 2:
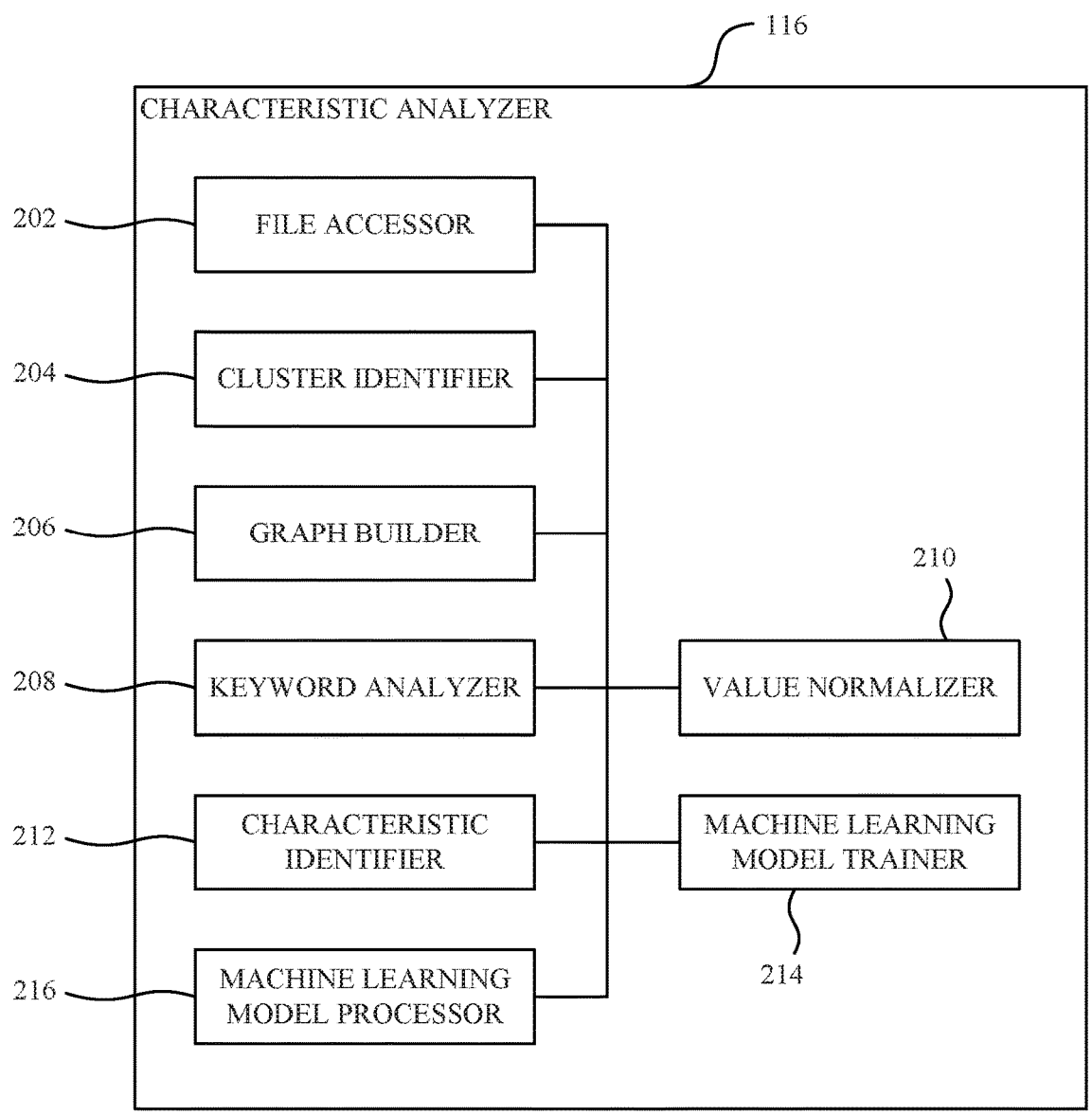
FIG. 2 is a block diagram of an example characteristic analyzer.

In the illustrated example of FIG. 2, the characteristic analyzer 116 includes the file accessor 202 to access the content within a client database 102, 104, 106. For example, the file accessor 202 accesses items within each client database, such as UPCs, custom characteristics, product (e.g., UPC) definitions, etc. In some examples, the file accessor 202 accesses the client database 102, 104, 106 content in response to a query, on a periodic basis, or on a scheduled basis.

In the illustrated example of FIG. 2, the cluster identifier 204 clusters client databases 102, 104, 106 into client clusters based on the number of overlapping UPCs between each client database 102, 104, 106. In some examples, the cluster identifier 204 computes similarity scores, based on UPC overlapping, and develops a matrix to determine which information from the client databases 102, 104, 106 to associate with each client cluster.

In the illustrated example of FIG. 2, the graph builder 206 creates concept clusters from the client clusters. For example, and as shown in greater detail below, the graph builder 206 creates nodes that represent custom characteristic values from particular client databases. The example graph builder 206 assigns micro-similarity scores between nodes of different custom characteristics (e.g., "S," "M," "L") based on UPC overlap between the nodes. In some examples, the micro-similarity scores are used to develop a macro-similarity score, in which the macro-similarity scores are used by the graph builder 206 to create one or more concept clusters. In some examples, the graph builder 206 adds nodes that satisfy particular requirements to other nodes to increase the micro and macro-similarity scores. For instance, the micro-similarity scores provide a way to determine which custom characteristics contain the same products. By adding nodes together that contain micro-similarities that are above a first threshold, the overall macro-similarity score will better represent the custom characteristic comparison by including more UPC overlaps in the final calculation.

In the illustrated example of FIG. 2, the keyword analyzer 208 develops sub-clusters within each concept cluster, based on UPC overlapping, and builds a keyword dictionary to determine dictionary values. For example, the keyword analyzer 208 builds a keyword dictionary, based on the UPC definitions, within a concept cluster, and numerically represents UPC definitions based on the keyword dictionary. In some examples, the numerical representation of each UPC definition contains an indexing number that represents a particular word and a count that represents how often an indexed word appears within the UPC definition. In some examples, the keyword analyzer 208 ranks the keywords to determine which keywords have the highest TFIDF value (e.g., most similar to the sub-clusters) and which keyword should be mapped to each sub-cluster. In such examples, the keywords, chosen by the keyword analyzer 208, are referred to as dictionary values.

In the illustrated example of FIG. 2, the value normalizer 210 determines whether the dictionary values, determined by the keyword analyzer 208, need to be modified. For example, the value normalizer 210 determines whether each dictionary value satisfies user-defined criteria. In some examples, the dictionary value results may not make sense and/or are not easily interpreted by an analyst and/or user. In some examples, if the dictionary values do not satisfy user-defined criteria, the value normalizer 210 modifies the dictionary values to be more easily interpreted/understood by an analyst and/or user. In such examples, the value normalizer 210 can allow for a user to modify the dictionary values, through the user interface 114 of FIG. 1.

In the illustrated example of FIG. 2, the characteristic identifier 212 assigns dictionary values to each UPC within the concept clusters. For example, the characteristic identifier 212 takes each UPC within a concept cluster and assigns a dictionary value base on a majority vote. Additional details on how the characteristic identifier 212 assigns dictionary values based on a majority vote is described in connection with FIG. 8. In some examples, the characteristic identifier 212 collects OGRDS concept definitions for each UPC within the concept clusters to be compared with the chosen dictionary values.

In the illustrated example of FIG. 2, the machine learning (ML) model trainer 214 trains a machine learning model to build a decision tree. For example, the ML model trainer 214 compares the OGRDS concept definitions, and other OGRDS characteristics corresponding to the OGRDS concept definitions, to the dictionary values to develop learned relationships. In some examples, the learned relationships are used by the ML model trainer 214 to construct a decision tree that will allow for UPCs to be fed through and be output with a final dictionary value.

In the illustrated example of FIG. 2, the machine learning (ML) model processor 216 applies the decision tree to UPCs. For example, the ML model processor 216 inputs UPCs into the decision tree to assign final dictionary values to each UPC. In such examples, the UPCs that are input into the decision tree can be UPCs already defined within the OGRDS, UPCs that did not receive a majority vote, and/or any other UPC needing a final dictionary value.

While an example manner of implementing the characteristic analyzer 116 of FIG. 1 is illustrated in FIGS. 1 and 2, one or more of the elements, processes, and/or devices illustrated in FIGS. 1 and 2 may be combined, divided, re-arranged, omitted, eliminated, and/or implemented in any other way. Further, the example file accessor 202, the example cluster identifier 204, the example graph builder 206, the example keyword analyzer 208, the example value normalizer 210, the example characteristic identifier 212, the example ML model trainer 214, the example ML model processor 216, the example user interface 114, and/or, more generally, the example characteristic analyzer 116 of FIGS. 1 and 2 may be implemented by hardware, software, firmware, and/or any combination of hardware, software, and/or firmware. Thus, for example, any of the example file accessor 202, the example cluster identifier 204, the example graph builder 206, the example keyword analyzer 208, the example value normalizer 210, the example characteristic identifier 212, the example ML model trainer 214, the example ML model processor 216, the example user interface 114, and/or, more generally, the example characteristic analyzer 116 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example file accessor 202, the example cluster identifier 204, the example graph builder 206, the example keyword analyzer 208, the example value normalizer 210, the example characteristic identifier 212, the example ML model trainer 214, the example ML model processor 216, and the example user interface 114 is/are hereby expressly defined to include a non-transitory computer readable storage device or storage disk such as a memory, a digital versatile disk (DVD), a compact disk (CD), a Blu-ray disk, etc., including the software and/or firmware. Further still, the example characteristic analyzer 116 of FIGS. 1 and/or 2 may include one or more elements, processes, and/or devices in addition to, or instead of, those illustrated in FIGS. 1 and 2, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the characteristic analyzer 116 of FIGS. 1 and 2 are shown in FIGS. 5, 6, 7, and 8. The machine readable instructions may be an executable program(s) or portion(s) of an executable program for execution by a computer processor such as the processor 912 shown in the example processor platform 900 discussed below in connection with FIG. 9. The program(s) may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program(s) is/are described with reference to the flowcharts illustrated in FIGS. 5, 6, 7, and 8, many other methods of implementing the example characteristic analyzer 116 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 5, 6, 7, and 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 3:
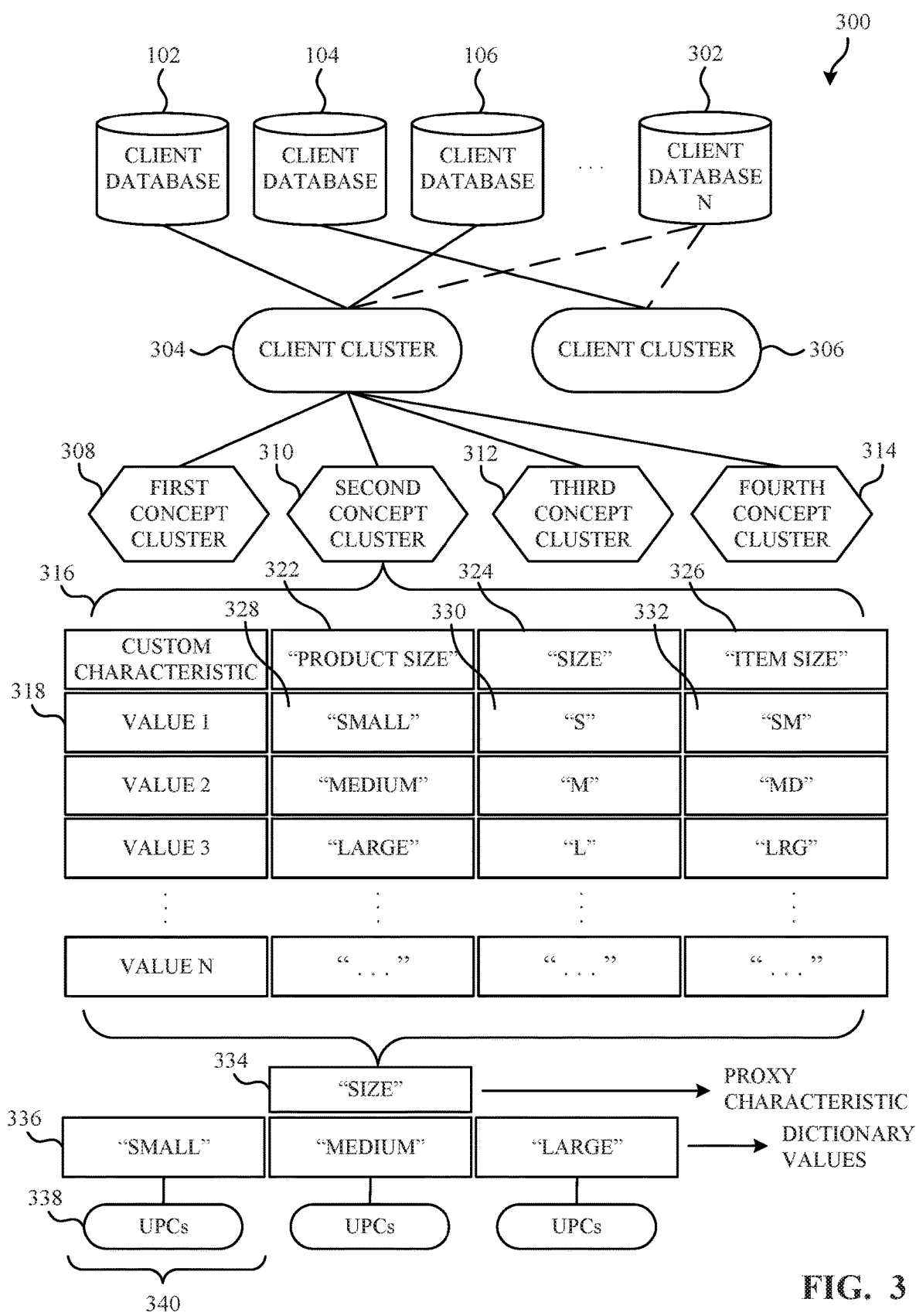
FIG. 3 is a diagram representative of an example characterization breakdown tree.

FIG. 3 is an example client specification characterization process that is representative of a characterization breakdown tree and illustrates how the client specifications are broken down and characterized. For example, the process 300 includes the client databases 102, 104, 106, and a client database N 302. In the illustrated example of FIG. 3, the client database N 302 is representative of one or more client databases, where N is the total amount of databases including the client databases 102, 104, 106. In such examples, the client database N 302 is similar to the client databases 102, 104, 106 and includes any number of informational items (e.g., descriptive characteristics), such as, UPCs, custom characteristics, product (e.g., UPC) definitions, particular nomenclature usage (e.g., the term "size" for size-related characteristics, or the term "product size" for size-related characteristics), etc.

In the illustrated example of FIG. 3, the client databases 102, 104, 106, 302 are divided into example client clusters 304, 306. Each of the example client clusters 304, 306 contains information from one or more client database(s) 102, 104, 106, 302 that are related to each other. For example, the cluster identifier 204 forms the client clusters 304, 306 by comparing the UPCs from each client database 102, 104, 106, 302 to all other UPCs within the client databases 102, 104, 106, 302. In some examples, the cluster identifier 204 computes a similarity score, based on the amount of overlapping UPCs (e.g., same UPC in both client databases 102, 104, 106, 302) between client databases 102, 104, 106, 302. In some examples, the cluster identifier 204 aggregates particular client database information that is more likely to include similar products. For instance, if two or more client databases include UPCs indicative of athletic clothing, then such information is clustered together in a client cluster. However, if a first client database includes a particular amount of UPCs indicative of athletic clothing, while a second database includes a particular amount of UPCs indicative of hardware items, then the example cluster identifier 204 does not group or otherwise cluster the information of the first and second client databases because of their relative dissimilarity in product overlap.

The example cluster identifier 204 develops a matrix corresponding to each client database 102, 104, 106, 302 and the similarity scores. In such examples, the matrix is based on the total number of client databases 102, 104, 106, 302 and contains the similarity scores for each client database 102, 104, 106, 302 UPC overlap comparison. In some examples, the Jaccard Similarity method is used to develop the similarity scores and matrix, but alternatively any other method can be used to compare the client databases 102, 104, 106, 302 to form client clusters 304, 306. In the illustrated example of FIG. 3, two client clusters 304, 306 are shown, but examples disclosed herein could have more or less client clusters 304, 306 based on the number and size of client databases 102, 104, 106, 302 being compared.

For example, the cluster identifier 204 puts the matrix, containing the similarity scores, through a clustering algorithm to form the client clusters 304, 306 based on the similarity scores. In some examples, an Adaptive Affinity Propagation Clustering algorithm is used to form the client clusters 304, 306, but alternatively any other method can be used to compare the client databases 102, 104, 106, 302 to form client clusters 102, 104, 106, 302. Advantageously, by using the Adaptive Affinity Propagation Clustering algorithm, the client clusters 304, 306 are formed without needing to know the final quantity of client clusters 304, 306 and/or the quantity of client cluster 304, 306 centers. In some examples, the process 300 can have more or less client clusters 304, 306 than what is depicted in FIG. 3.

In the illustrated example of FIG. 3, the graph builder 206 further breaks down each of the client clusters 304, 306 into example concept clusters 308 (a first concept cluster), 310 (a second concept cluster), 312 (a third concept cluster), 314 (a fourth concept cluster). For example, the second concept cluster 310 includes the elements illustrated in an example custom characteristic table 316. In the illustrated example of FIG. 3, the example second concept cluster 310 includes an example first value 318, an example first custom characteristic 322, an example second custom characteristic 324, an example third custom characteristic 326, an example first custom characteristic value 328, an example second custom characteristic value 330, and an example third custom characteristic value 332. In some examples, the custom characteristic table 316 can include any number of custom characteristics and any number of custom characteristic values.

In the illustrated example of FIG. 3, the first example custom characteristic 322 represents "PRODUCT SIZE" and describes the first example custom characteristic value 328, "SMALL," along with other custom characteristic values, "MEDIUM" and "LARGE." In another example, the second custom characteristic 324 represents "SIZE" and describes the second custom characteristic value 330, "S," along with other custom characteristic values, "M" and "L." In another example, the third custom characteristic 326 represents "ITEM SIZE" and describes the third example custom characteristic value 332, "SM," along with other custom characteristic values, "MD" and "LRG." The custom characteristic values 328, 330, 332 each represent a portion of all UPCs (e.g., products) within respective client databases 102, 104, 106, 302. For instance, each column within the example custom characteristic table 316 represents a portion of a client database 102, 104, 106, 302 UPC list and each custom characteristic value 328, 330, 332 represents part of that portion of the UPC list. As shown, each custom characteristic 322, 324, 326 and the corresponding custom characteristic values 328, 330, 332 are similar in concept (e.g., size), but have different nomenclature (e.g., names). As described above, such nomenclature mismatch between different market entities (e.g., different retailers and/or manufacturers) causes erroneous results. The example characteristic analyzer 116 analyzes the different nomenclatures and creates a standardized set of values that describe the concept cluster(s) 308, 310, 312, 314 and custom characteristic values 322, 324, 326. Additional details on how the concept clusters 308, 310, 312, 314 are formed (e.g., chosen, created, developed) is further described in connection with FIGS. 4A-4C.

In the illustrated example of FIG. 3, the graph builder 206 characterizes and/or otherwise normalizes the custom characteristics 322, 324, 326 as an example proxy characteristic 334. For example, the second concept cluster 310 includes custom characteristics 322, 324, 326 all pertaining to the concept of "size," but the custom characteristics 322, 324, 326 may not all have the same name (e.g., "PRODUCT SIZE", "SIZE", "ITEM SIZE"). In such examples, the proxy characteristic 334 is used to define all of the custom characteristics 322, 324, 326 within the second concept cluster 310 based on UPC overlap between the custom characteristic values 328, 330, 332 within respective custom characteristics 322, 324, 326. Additional details on how the proxy characteristic 334 is chosen is further described in connection with the flowcharts of FIG. 6.

In the illustrated example of FIG. 3, a set of example dictionary values 336 are used by the keyword analyzer 208 to define all of the custom characteristic values 328, 330, 332 within the second concept cluster 310. For example, once the graph builder 206 defines the second concept cluster 310 with a proxy characteristic 334, the keyword analyzer 208 assigns dictionary values 336 to all of the custom characteristic values 328, 330, 332. In some examples, to assign dictionary values 336 to the second concept cluster 310, sub-clusters 340 are created by the graph builder 206 within the second concept cluster 310. In some examples, the graph builder 206 creates the sub-clusters 340 based on UPC overlaps between each custom characteristic value 328, 330, 332 within the second concept cluster 310 to group together custom characteristic values 328, 330, 332 that include similar products (e.g., UPCs). Stated differently, the sub-clusters 340 are a further grouping of the custom characteristic values. For instance, wherein the concept clusters 308, 310, 312, 314 include any number of different custom characteristic values 328, 330, 332, (e.g., "SMALL", "MD", "L", "S", "LARGE", etc.) the sub-clusters 340 further group similar custom characteristic values 328, 330, 332 together (e.g., "SMALL", "S", "SM"). In such examples, the sub-clusters 340 are created by the graph builder 206 using the Louvain Clustering method and each sub-cluster 340 contains a UPC list 338, wherein the UPC list 338 contains the UPCs associated with each custom characteristic value 328, 330, 332 within the sub-cluster 340. In such examples, the keyword analyzer assigns each sub-cluster 340 a dictionary value 336 as shown in FIG. 3.

In some examples, to begin determining what the dictionary values 336 should be, the keyword analyzer 208 gathers UPC definitions for each UPC within the second concept cluster 310. In such examples, the UPC definitions contain items such as, the UPC number and any custom characteristic value 328, 330, 332 associated with that UPC. In some examples, the keyword analyzer creates a keyword dictionary based on the custom characteristic values 328, 330, 332 within the second concept cluster 310. In such examples, the keyword analyzer 208 uses the keyword dictionary to assign each unique word (e.g., keyword, particular grouping of letters, etc.), within all of the second concept cluster 310 UPC definitions, a value (e.g., number).

In some examples, the keyword analyzer 208 applies the keyword dictionary to each UPC, wherein each UPC may have more than one custom characteristic value 328, 330, 332 depending on the particular custom characteristic 322, 324, 326 the UPC is associated with. For instance, within the first custom characteristic 322, a UPC may have the custom characteristic value 328 of "SMALL," but that same UPC, under the second custom characteristic 324, may have the custom characteristic value 330 of "S."

In some examples, the keyword analyzer 208 applies the keyword dictionary to each UPC definition within the second concept cluster 310 and a Term Frequency-Inverse Document Frequency (TFIDF) technique is used by the keyword analyzer 208 to determine the frequently occurring unique words for particular UPC definitions. The unique words are the dictionary values 336 used to describe each sub-cluster 340. In some examples, once the keyword analyzer 208 determines the dictionary values 336, a chi-squared statistics method is used by the keyword analyzer 208 to map each dictionary value 336 to the proper sub-cluster 340. Additional detail as to how the sub-clusters 340 are used to compile final dictionary values is described in connection with the flowcharts of FIG. 7.

The diagrams of FIGS. 4A, 4B, and 4C are representative of an example graph matching process 400A, 400B, 400C that implements an iterative process to create concept clusters 308, 310, 312, 314 based on custom characteristics within a client cluster 304, 306. For example, each custom characteristic, and the corresponding custom characteristic values, within a client cluster 304, 306, are compared to every other custom characteristic within the client cluster 304, 306.

For example, FIGS. 4A, 4B, and 4C include an example fourth custom characteristic 402, an example fifth custom characteristic 404, an example first node 406, an example second node 408, an example third node 410, an example fourth node 412, an example fifth node 414, an example sixth node 416, an example seventh node 418, and an example eighth node 420. As described above, a node represents a quantity of UPCs from a particular client database that have a common/matching custom characteristic (e.g., "product size"). For example, the first node 406 represents a quantity of UPCs having the custom characteristic "product size" from a first client database, and the second node 408 represents another quantity of UPCs having that same custom characteristic, but from a different client database. Generally speaking, when a threshold quantity of UPCs match, but have different nomenclature, such UPCs are deemed to be the same product and should share a common name or proxy characteristic. FIGS. 4A, 4B, and 4C also include an example first micro-similarity score 422, an example second micro-similarity score 424, an example third micro-similarity score 426, an example fourth micro-similarity score 428, an example fifth micro-similarity score 430, an example sixth micro-similarity score 432, and an example seventh micro-similarity score 434.

In the illustrated example of FIGS. 4A, 4B, and 4C, each column (e.g., a custom characteristic 402, and the corresponding nodes 406, 408, 410) is representative of a custom characteristic and corresponding custom characteristic values for a particular client (e.g., client database) within a client cluster 304, 306. In some examples, the columns being compared may be similar and have two or more UPCs in common. In some examples, the columns being compared may not be similar and therefore would not have many UPCs in common. By making these UPC overlapping comparisons, clusters of similar UPCs (e.g., concept clusters) will be formed.

In the illustrated example of FIGS. 4A, 4B, and 4C, the example fourth custom characteristic 402 (e.g., "PRODUCT SIZE") and the example fifth custom characteristic 404 (e.g., "SIZE") are similar to the custom characteristics 322, 324 of FIG. 3 (e.g., similar in terms of overlapping UPC values, similar in terms of similarity index comparisons (e.g., Jaccard) of product characteristics, etc.). In the illustrated example of FIGS. 4A, 4B, and 4C, the first through the eighth nodes 406-420 are custom characteristic values 328, 330, 332. For example, the first node 406, the second node 408, and the third node 410 represent particular example custom characteristic values that correspond to the fourth custom characteristic 402 ("product size"). For example, the fourth, fifth, sixth, seventh, and eighth nodes 412, 414, 416, 418, 420 represent example custom characteristic values that correspond to the fifth custom characteristic 404 ("size"). In such examples, a node contains a set of UPCs that correspond to the custom characteristic value 328, 330, 332 in which the node is representative of. For clarification purposes, the fourth custom characteristic 402 includes three nodes 406, 408, 410 and the fifth custom characteristic 404 includes five nodes 412, 414, 416, 418, 420, as illustrated in FIG. 4A. Alternatively, the custom characteristics 402, 404 can include any number of nodes depending on the number of custom characteristic values (e.g., "SMALL", "MEDIUM", "LARGE", etc.) the custom characteristic 402, 404 may have.

In the illustrated example of FIGS. 4A, 4B, and 4C, each node 406-420 represents a custom characteristic value 328, 330, 332 that contains a particular number of UPCs. For example, the graph builder 206 compares each node 406, 408, 410 within the fourth custom characteristic 402 to each node 412, 414, 416, 418, 420 within the fifth custom characteristic 404. In such examples, the graph builder 206 compares node 406, 408, 410 to nodes 412, 414, 416, 418, 420, based on the number of UPCs that overlap between respective pairs of nodes, and assigned a micro-similarity score 422-430 represented by arrows in FIGS. 4A and 4B. The micro-similarity scores are a count value used to determine if respective custom characteristic pairs are closely related based on the amount (e.g., a threshold quantity) of UPCs that the custom characteristics have in common. In some examples, each node-to-node relationship is initially given a micro-similarity score 422-430 of one.

In the illustrated example of FIG. 4B, the first, second, and third micro-similarity scores 422, 424, 426 represent maximum micro-similarity scores (e.g., largest micro-similarity score (e.g., highest relative count of matching UPCs) for each respective node within the custom characteristic containing the least amount of nodes) for the respective fourth custom characteristic 402 nodes 406, 408, 410 when compared to the fifth custom characteristic 404 nodes 412, 414, 416, 418, 420. For example, the graph builder 206 compares the first node 406 to the fourth, fifth, sixth, seventh, and eighth nodes 412, 414, 416, 418, 420, and determines the maximum micro-similarity score 422 to be with the fourth node 412. In such examples, the maximum micro-similarity scores 422, 424, 426 are compared with the total number of overlapping UPCs between the fourth and fifth custom characteristics 402, 404. In such examples, for a maximum micro-similarity score 422, 424, 426 to be considered in further calculations, the maximum micro-similarity score 422, 424, 426 must satisfy a first threshold. In some examples, the first example threshold is a micro-similarity score value based on the total number of overlapping UPCs between respective pairs of custom characteristics. For instance, if there are 1000 total overlapping UPCs between the fourth and fifth custom characteristics 402, 404 and the maximum micro-similarity scores 422, 424, 426 are calculated to have values of 250, 200, and 300 (sum=750), then, the macro-similarity score is the sum of the maximum micro-similarity scores 422, 424, 426 divided by the total number of overlapping UPCs (sum=1000), or a macro-similarity score of 75%. In such examples, the macro-similarity score of 75% is a first iteration where some nodes (e.g., nodes 414, 416) within a custom characteristic 402, 404 may not have been assigned with a maximum micro-similarity score 422, 424, 426.

In some examples, because not every node will have a maximum micro-similarity score 422, 424, 426, there may be some nodes that have a relatively large amount of UPC overlaps that are not considered in the final macro-similarity score. By not considering nodes that have a relatively large amount of UPC overlaps, just because they did not receive a maximum micro-similarity score 422, 424, 426, the macro-similarity score will not accurately represent the similarities between the respective custom characteristics 402, 404. In effect, the products (e.g., UPCs) associated with those nodes that did not have the requisite first threshold quantity of matches will not be assigned a proxy characteristic and thus, not be considered in market analysis efforts. Accordingly, while some nodes were simply not large enough to satisfy the threshold, they may still include UPCs deemed the same as other UPCs despite the dissimilar nomenclature. Further iterations, to consider each node, will provide a more accurate comparison and are described below.

In some examples, if there are nodes 414, 416 that did not get assigned a maximum micro-similarity score 422, 424, 426 (e.g., unassigned nodes or nodes not paired), then, the next highest micro-similarity scores 428, 430 for the unassigned nodes 414, 416 are evaluated. The next highest micro-similarity scores may be nodes that have a relative maximum micro-similarity score that did not satisfy the first threshold. In some examples, the next highest micro-similarity scores correspond to a portion (e.g., percentage) of remaining nodes, such as 20% of the remaining nodes (e.g., if there were 100 remaining nodes that did not satisfy the first threshold, then 20 more nodes are selected based on how close their micro-similarity scores are to a relative maximum). In such examples, if the graph builder 206 determines that the highest micro-similarity scores 428, 430, for the unassigned nodes 414, 416, satisfy the first example threshold, then, the graph builder 206 combines the fifth and sixth nodes 414, 416 (e.g., unassigned nodes) with respective nodes 412, 418 that already have a maximum micro-similarity score 422, 424. For instance, the graph builder 206 did not assign the fifth example node 414 a maximum micro-similarity score 422, 424, 426 initially, but the fifth example node 414 had an example micro-similarity score 428 that satisfied the first example threshold. Therefore, the fifth example node 414 is combined (merged) with the fourth example node 412 and a new example sixth micro-similarity score 432 is calculated, as illustrated in FIG. 4C. In another example, the graph builder 206 did not assign the sixth node 416 a maximum micro-similarity score 422, 424, 426 initially, but had a micro-similarity score 430 that satisfied the first threshold. Therefore, the graph builder 206 combines (merges) the example sixth node 416 with the example seventh node 418 and a new example seventh micro-similarity score 434 is calculated, as illustrated in FIG. 4C. In such examples, the fourth and fifth micro-similarity scores 428, 430 have example values of 100 and 100 and are combined with the fourth and seventh nodes 412, 418 in FIG. 4C.

In FIG. 4C, with the new sixth and seventh example micro-similarities 432, 434, the graph builder 206 calculates a new macro-similarity score. For example, the sixth micro-similarity score 432 represents the number of overlapping UPCs between the first node 406 and the combination of the fourth and fifth nodes 412, 414. In such examples, the seventh micro-similarity score 434 represents the number of overlapping UPCs between the second node 408 and the combination of the sixth and seventh nodes 416, 418. For instance, there are still 1000 total overlapping UPCs between the fourth and fifth custom characteristics 402, 404, but now, the largest micro-similarity scores 426, 432, 434 are calculated to have values of 350, 300, and 300. Therefore, the macro-similarity score, being the sum of the micro-similarity scores 422, 424, 426 divided by the total number of overlapping UPCs, is now 95%. In other words, the characteristic analyzer 116 iteratively evaluates the node-to-node relationships between respective custom characteristics 402, 404 to ensure that macro-similarity scores include the micro-similarity scores that satisfy the first threshold.

For example, once the graph builder 206 evaluates each node 406-420 based on a micro-similarity score, a final macro-similarity score is determined for each respective custom characteristic 402, 404 pair. In some examples, macro-similarity scores are determined between each custom characteristic within a client cluster 304, 306, and the graph builder 206 applies a Louvain Clustering Method to cluster custom characteristics together, based on the macro-similarity scores. Using the macro-similarities and the Louvain Clustering Method, the client clusters 304, 306 are further divided (e.g., organized, filtered) into the concept clusters 308, 310, 312, 314 of FIG. 3. As described further below, now that differently named custom characteristics (e.g., "Product Size" and "Item Size") are identified as having a requisite (e.g., threshold) degree of similarity, the example characteristic analyzer 116 assigns these corresponding UPCs a dictionary value that is common to both. As such, market research analytics may be performed in a more accurate manner in connection with products that have a degree of similarity despite having different nomenclature.

Figure 5:
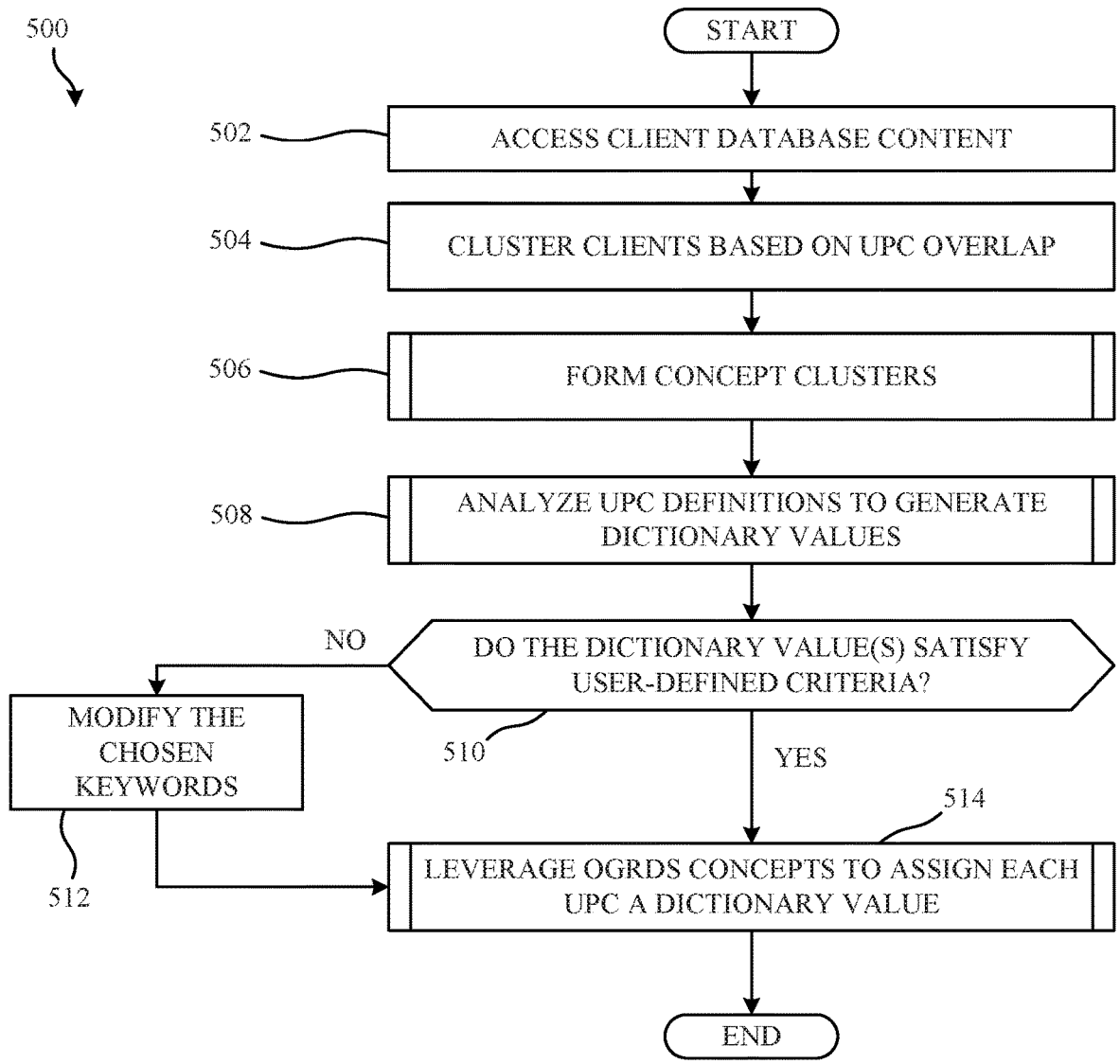
FIG. 5-8 are flowcharts representative of example methods that may be executed by the example characteristic analyzer of FIGS. 1 and/or 2 to map custom client specifications with standardized characteristics.

FIG. 5 is a flowchart representative of example machine-readable instructions that may be executed to implement the characteristic analyzer 116 of FIGS. 1 and/or 2. The example machine-readable instructions of FIG. 5 begin at block 502 at which the file accessor 202 accesses one or more client databases (e.g., client databases 102, 104, 106, 302) for content. In such examples, the client database 102, 104, 106, 302 content includes the client specifications that contain items such as, UPCs, custom characteristics, product (e.g., UPC) definitions, etc. In some examples, the file accessor 202 accesses the client databases 102, 104, 106, 302 content at any point during the execution of the machine-readable instructions of FIG. 5.

At block 504, the example cluster identifier 204 clusters client databases 102, 104, 106, 302 based on UPC overlap. For example, the cluster identifier 204 clusters client databases 102, 104, 106, 302 into client clusters 304, 306 based on the number of overlapping UPCs between each client database 102, 104, 106, 302. In such examples, the cluster identifier 204 computes a similarity score, based on the amount of overlapping UPCs (e.g., same UPC in both client databases 102, 104, 106, 302) between client databases 102, 104, 106, 302, and develops a matrix based on the similarity score. In such examples, the Jaccard Similarity method is used to compute the similarity scores and the matrix. In some examples, the formation of the example client clusters 304, 306 is a first-pass at developing a degree of uniformity or similarity in a large assortment of available product information from many different retailers. For instance, some retailers and their corresponding databases relate to product types that are very different from other retailers (e.g., department store retailers versus automotive store retailers). In other examples, some retailers and their corresponding databases relate to product types that are very similar to other retailers (e.g., a first department store retailer and a second department store retailer).

At block 506, the example characteristic analyzer 116 forms concept clusters 308, 310, 312, 314. For example, the characteristic analyzer 116 uses custom characteristics 322, 324, 326, custom characteristic values 328, 330, 332, and UPCs associated with the custom characteristic values 328, 330, 332 to form concept clusters 308, 310, 312, 314. Additional details on how the characteristic analyzer 116 forms the concept clusters 308, 310, 312, 314 is further described below in connection with FIG. 6. In some examples, the formation of the example concept clusters 308, 310, 312, 314 is a second-pass at developing a degree of uniformity or similarity in the large assortment of available product information from the many different retailers.

At block 508, the example characteristic analyzer 116 analyzes UPC definitions to generate dictionary values 336. For example, the characteristic analyzer 116 uses the UPC definitions within a concept cluster 308, 310, 312, 314 to generate dictionary values 336 that represent the custom characteristic values 328, 330, 332. Additional details on how the characteristic analyzer 116 analyzes UPC definitions to generate dictionary values 336 is further described below in connection with FIG. 7.

At block 510, the example value normalizer 210 determines whether the dictionary values 336 need to be modified. For example, the value normalizer 210 determines whether the dictionary values 336 satisfy user-defined criteria (e.g., number of vowels, length of values, letter combinations, pre-existing words, etc.). In some examples, the value normalizer 210 can allow a user to participate in determining whether the dictionary values 336 need to be modified.

If, at block 510, the value normalizer 210 determines that the dictionary values 336 do not satisfy the user-defined criteria, then, at block 512, the value normalizer 210 modifies the dictionary values 336 based on the user-defined criteria. For instance, if dictionary values 336 of "small, M, and LG" were assigned to a concept cluster 308, 310, 312, 314, the value normalizer 210 can modify the dictionary values 336, based on the user-defined criteria, to, for example, "SM, MD, LG" or "S, M, L." For example, by modifying the dictionary values 336, more consistent and/or more easily interpreted/understood dictionary values are obtained. In some examples, the modified dictionary values 336 have a nomenclature that can be used across more and/or different client databases that contain similar products. Although the characteristic analyzer 116 may output dictionary values 336 that describe the concept cluster 308, 310, 312, 314, the value normalizer 210 provides a way to make sure that the dictionary values 336 make sense to a user. In some examples, the value normalizer 210 can allow a user to select new dictionary values 336 to replace the current dictionary values 336.

If, at block 510, the example value normalizer 210 determines that the example dictionary values 336 satisfy the user-defined criteria, then, at block 514, the example characteristic analyzer 116 leverages reference database 108 concepts to assign each UPC a dictionary value 336. For example, the characteristic analyzer 116 uses UPC definitions, already defined within the reference database 108 (e.g., OGRDS), to build a decision tree that assigns final dictionary values 336 to each UPC within the custom specification mapping system 100. Additional details on how the characteristic analyzer 116 leverages reference database 108 concepts is further described below in connection with FIG. 8.

Figure 6:
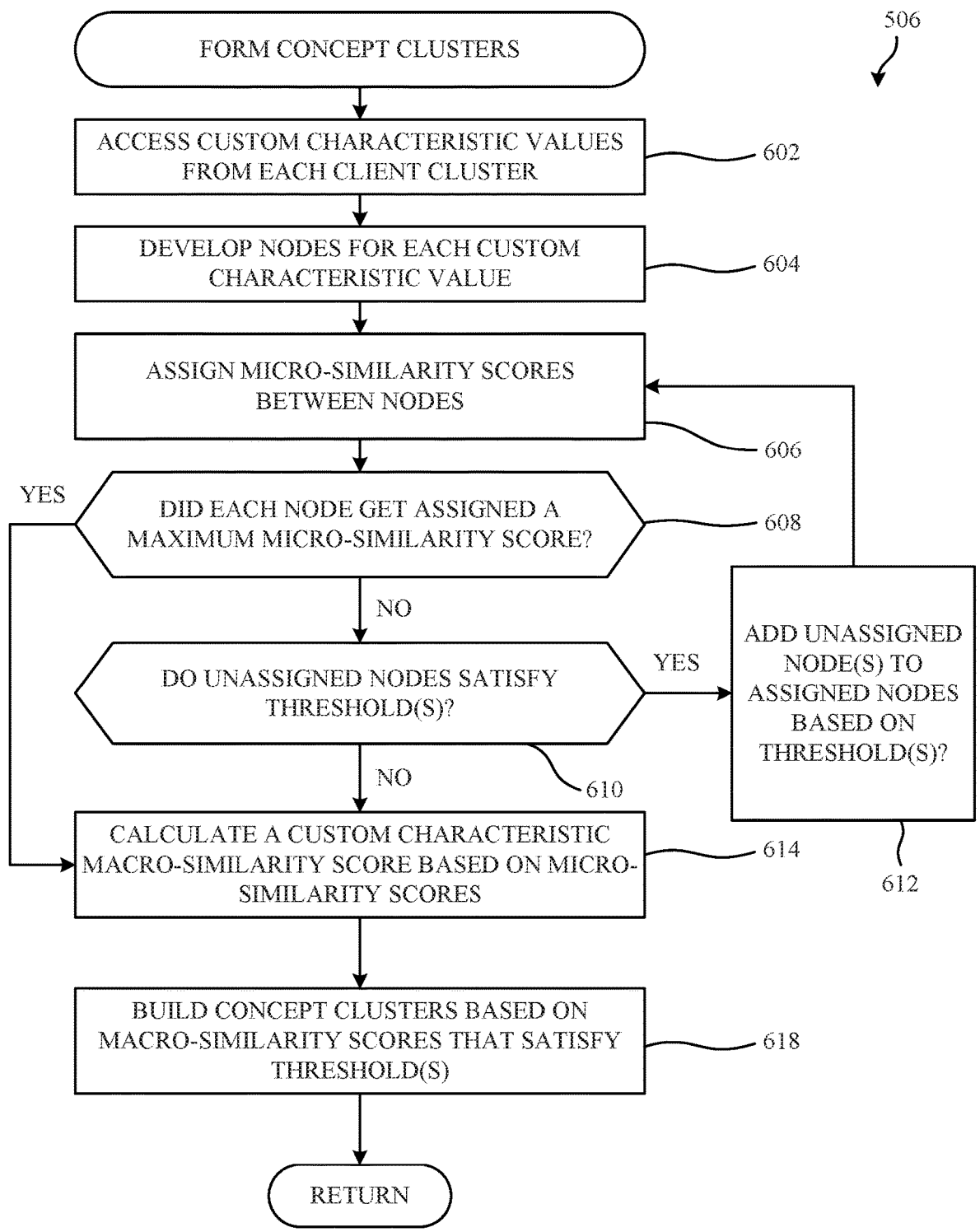

The flowchart of FIG. 6 is representative of example machine-readable instructions that may be executed to implement block 506 of FIG. 5. The example machine-readable instructions of FIG. 6 begin at block 602 at which the characteristic analyzer 116 accesses the custom characteristic values 328, 330, 332 from each client cluster 304, 306. For example, the graph builder 206 accesses the custom characteristic values 328, 330, 332, within each client database 102, 104, 106, 302, found within respective client clusters 102, 104, 106, 302. In some examples, example custom characteristic values 328, 330, 332 have already been logically grouped (clustered) as concept clusters (e.g., the example second concept cluster 310 of FIG. 3).

At block 604, the example graph builder 206 develops and/or otherwise generates nodes 406-420 for each custom characteristic value 328 (e.g., "SMALL"), 330 (e.g., "S"), 332 (e.g., "SM"). For example, the graph builder 206 takes each custom characteristic value 328, 330, 332 and creates corresponding nodes 406-420 representing custom characteristic values 328, 330, 332, wherein each custom characteristic value 328, 330, 332 contains UPCs associated with it. In such examples, the nodes 406-420 correspond to particular custom characteristics 402, 404.

At block 606, the example graph builder 206 assigns, calculates and/or otherwise generates micro-similarity scores 422-434 between nodes 406-420 to be used in the Maximum Weighted Bipartite Graph Matching (MWBGM) process. For example, the graph builder 206 assigns micro-similarity scores 422-434 for each node relationship, as shown in FIG. 3, based on the number of UPCs that overlap between respective pairs of nodes 406-420. However, typical MWBGM operations analyze an existing (e.g., a priori) set of nodes for analysis, in which some nodes might not be considered and/or otherwise calculated for lack of requisite qualifications (e.g., lacking a threshold number of matching UPCs with respect to relative quantities of alternate nodes having a larger quantity of matching UPCs). Accordingly, standard MWBGM operations fail to consider all available data that may be useful and/or otherwise relevant for market analysis purposes. Examples disclosed herein modify and/or otherwise enhance standardized MWBGM processes to avoid the negative consequences of discarding data that would otherwise be relevant for market analysis purposes.

At block 608, the example graph builder 206 determines whether each example node 406-420 was assigned a maximum micro-similarity score 422, 424, 426. For example, the graph builder 206 analyzes each node 406, 408, 410, within the custom characteristic 402 that contains the least number of nodes, and identifies the maximum micro-similarity score 422, 424, 426 for each node 406, 408, 410. In such examples, the graph builder 206 uses the identified maximum micro-similarity scores 422, 424, 426 to identify the nodes 414, 416 that do not contain a maximum micro-similarity score 422, 424, 426 and/or are otherwise unassigned nodes 414, 416. As mentioned previously, a maximum micro-similarity score 422, 424, 426 is a micro-similarity score 422-434 that satisfies a first threshold (e.g., a relative quantity of matching UPCs) and is the largest micro-similarity score 422, 424, 426 for a particular node 406-420. In some examples, the first threshold is based on a percentage of the total number of UPCs within a client cluster 304, 306.

If, at block 608, the graph builder 206 determines that each node 406-420 did not get assigned a maximum micro-similarity score 422-434, then, at block 610, the characteristic analyzer 116 determines whether the unassigned nodes 414, 416 satisfy the first threshold. For example, the graph builder 206 identifies the largest micro-similarity score associated with each unassigned node 414, 416 and determines whether the micro-similarity score 428, 430 satisfies the first threshold.

If, at block 610, the graph builder 206 determines that at least one unassigned node 414, 416 satisfies the first threshold, then, at block 612, the graph builder 206 adds the unassigned node(s) 414, 416 to the assigned nodes 412, 418, within the same custom characteristic 404, that are associated with a similar node 406, 408 of the comparing custom characteristic 402. If, at block 610, the graph builder 206 determines that no unassigned nodes 414, 416 satisfy the first threshold, then, at block 614, the characteristic analyzer 116 calculates custom characteristic macro-similarity scores based on the micro-similarity scores 426, 432, 434. For example, the graph builder 206 calculates a macro-similarity score by summing the micro-similarity scores 426, 432, 434 and dividing the sum by the total number of overlapping UPCs between the two custom characteristics 402, 404 being compared.

At block 618, in response to macro-similarity scores being calculated for each possible custom characteristic pairing within a client cluster 304, 306, the graph builder 206 builds concept clusters 308, 310, 312, 314 based on the calculated macro-similarities. For example, the graph builder 206 clusters custom characteristics 322, 324, 326 together that satisfy a second example threshold (e.g., a desire to assign 95% of the available UPCs, a desire to assign at least more than 80% of the available UPCs, etc.), based on the macro-similarity scores. In some examples, the second threshold is a minimum macro-similarity score value. In some examples, the second threshold is based on the number of custom characteristics 322, 324, 326 within a client cluster 304, 306. In some examples, the second threshold is based on a percentage of calculated macro-similarity scores. In some examples, not every custom characteristic 322, 324, 326 will be added to a concept cluster 308, 310, 312, 314. In some examples, the graph builder 206 assigns each concept cluster 308, 310, 312, 314 a proxy characteristic name (e.g., "SIZE"), based on the custom characteristic names within the concept clusters 308, 310, 312, 314.

Figure 7:
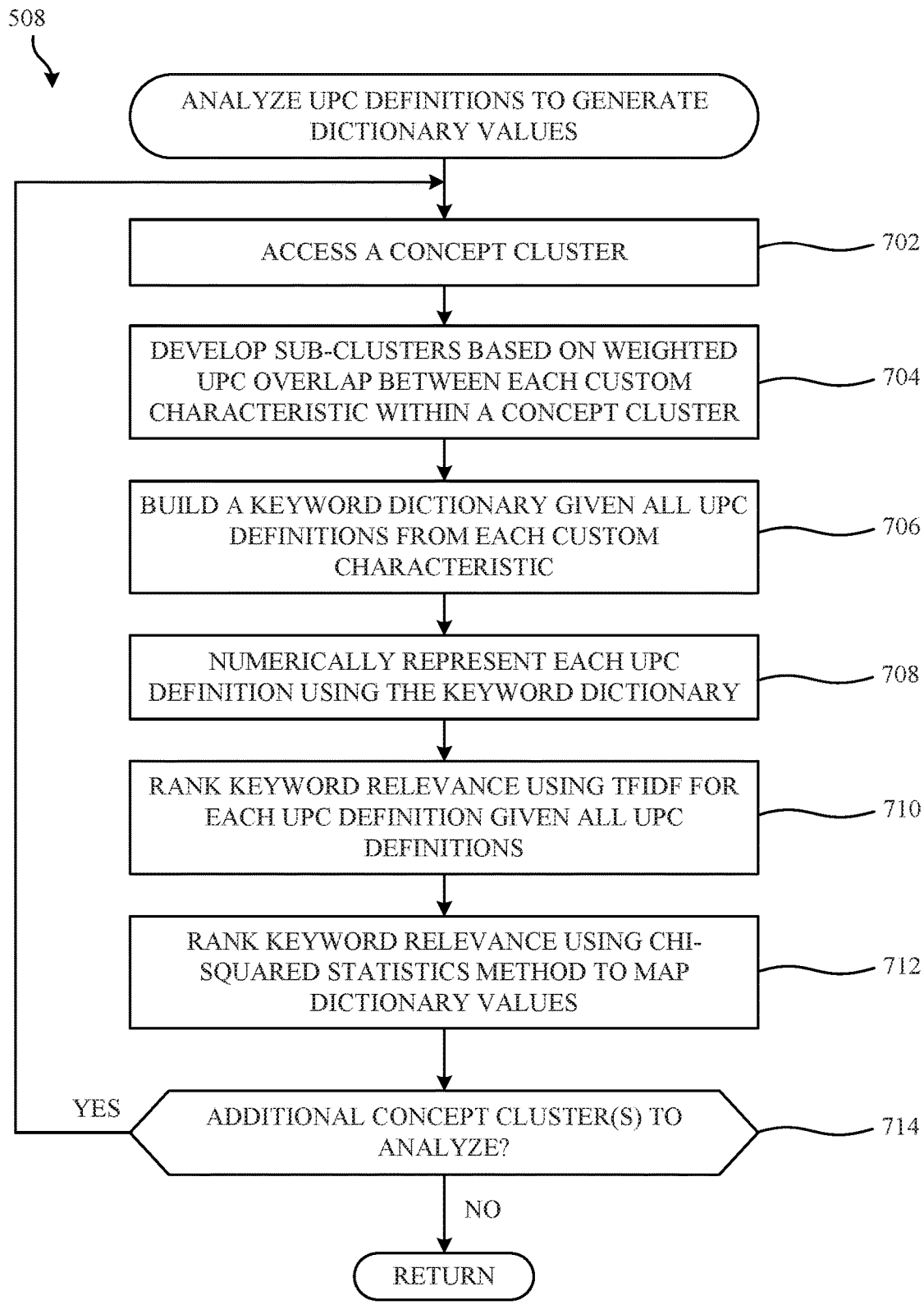

The flowchart of FIG. 7 is representative of example machine-readable instructions that may be executed to implement block 508 of FIG. 5. The example machine-readable instructions of FIG. 7 begin at block 702 at which the characteristic analyzer 116 accesses a concept cluster 308, 310, 312, 314. For example, the keyword analyzer 208 accesses a concept cluster 308, 310, 312, 314, previously clustered by the graph builder 206, to be analyzed.

At block 704, the example characteristic analyzer 116 develops sub-clusters 340 based on weighted UPC overlap between each custom characteristic 322, 324, 326 within a concept cluster 308, 310, 312, 314. For example, the keyword analyzer 208 develops sub-clusters 340 to group together custom characteristics values 328, 330, 332 that contain similar products (e.g., UPCs). In such examples, the sub-clusters 340 are created based on UPC overlaps between each custom characteristic value 328, 330, 332 within a concept cluster 308, 310, 312, 314. In such examples, each sub-cluster 340 contains a UPC list 338, wherein the UPC list 338 contains the UPCs associated with each custom characteristic value 328, 330, 332 within the sub-cluster 340.

At block 706, the example characteristic analyzer 116 builds a keyword dictionary given all UPC definitions from each custom characteristic 322, 324, 326. For example, the keyword analyzer 208 gathers each UPC definition within a concept cluster and assigns each unique word (e.g., keyword, particular grouping of letters, etc.) a value (e.g., number). In such examples, the keyword dictionary is a numerical representation of each custom characteristic word within a concept cluster 308, 310, 312, 314.

At block 708, the example characteristic analyzer 116 numerically represents each UPC definition using the keyword dictionary. For example, the keyword analyzer 208 uses the keyword dictionary to numerically represent each UPC definition, within the corresponding concept cluster 308, 310, 312, 314. In such examples, the numerical representation of the UPC definitions can include an index (e.g., the number corresponding to the keyword dictionary) and a count (e.g., how many times the keyword is listed in the UPC definition).

For instance, an example keyword dictionary could be [('BREED', 0), ('DOG', 1), ('MEDIUM', 2), ('SMALL', 3), ('LARGE', 4), ('BRD', 5), ('GIANT', 6), ('TOY', 7)], wherein each unique word within a custom characteristic is assigned a number. For instance, if a UPC definition contained custom characteristic values of "SMALL BREED DOG," "SMALL DOG," and "SMALL BREED, then, the numerical representation of the UPC definition would be [(0, 2), (1, 2), (3, 3)], wherein the first number within a set of parenthesis is the index number and the second number within a set of parenthesis is the count.

At block 710, the example characteristic analyzer 116 ranks keyword relevancy using the TFDIF method for each UPC definition given all UPC definitions. For example, the keyword analyzer 208 analyzes each UPC definition, using the TFDIF method and the numerical representation of the UPC definition, to identify a keyword that frequently occurs within that particular UPC definition. In such examples, the keywords that best describe the UPC definitions are the dictionary values 336. In some examples, keyword dictionary values that are found within multiple UPC definitions within a sub-cluster 340 have a lower TFDIF value than keyword dictionary values that are not spread across multiple UPC definitions.

At block 712, the example characteristic analyzer 116 ranks keyword relevancy using the chi-squared statistics method within each UPC definition. For example, in response to identifying the dictionary values 336, the keyword analyzer 208 analyzes the dictionary values 336, using the chi-squared statistic method, to map each dictionary value 336 to the proper sub-cluster 340.

At block 714, the example characteristic analyzer 116 determines whether there are additional cluster(s) to analyze. For example, the keyword analyzer 208 checks each concept cluster 308, 310, 312, 314 to see if dictionary values 336 have been assigned to sub-clusters 340. If, at block 714, the example keyword analyzer 208 determines that there are additional concept clusters 308, 310, 312, 314 to be analyzed, then, the instructions of FIG. 7 return back to block 702 at which the example keyword analyzer 208 accesses a concept cluster 308, 310, 312, 314 that has not yet had dictionary values 336 assigned to sub-clusters 340. If, at block 714, the example keyword analyzer 208 determines that there are no concept clusters 308, 310, 312, 314 to be analyzed, then, the instructions of FIG. 7 conclude and resume the instructions of FIG. 5 at block 510.

Figure 8:
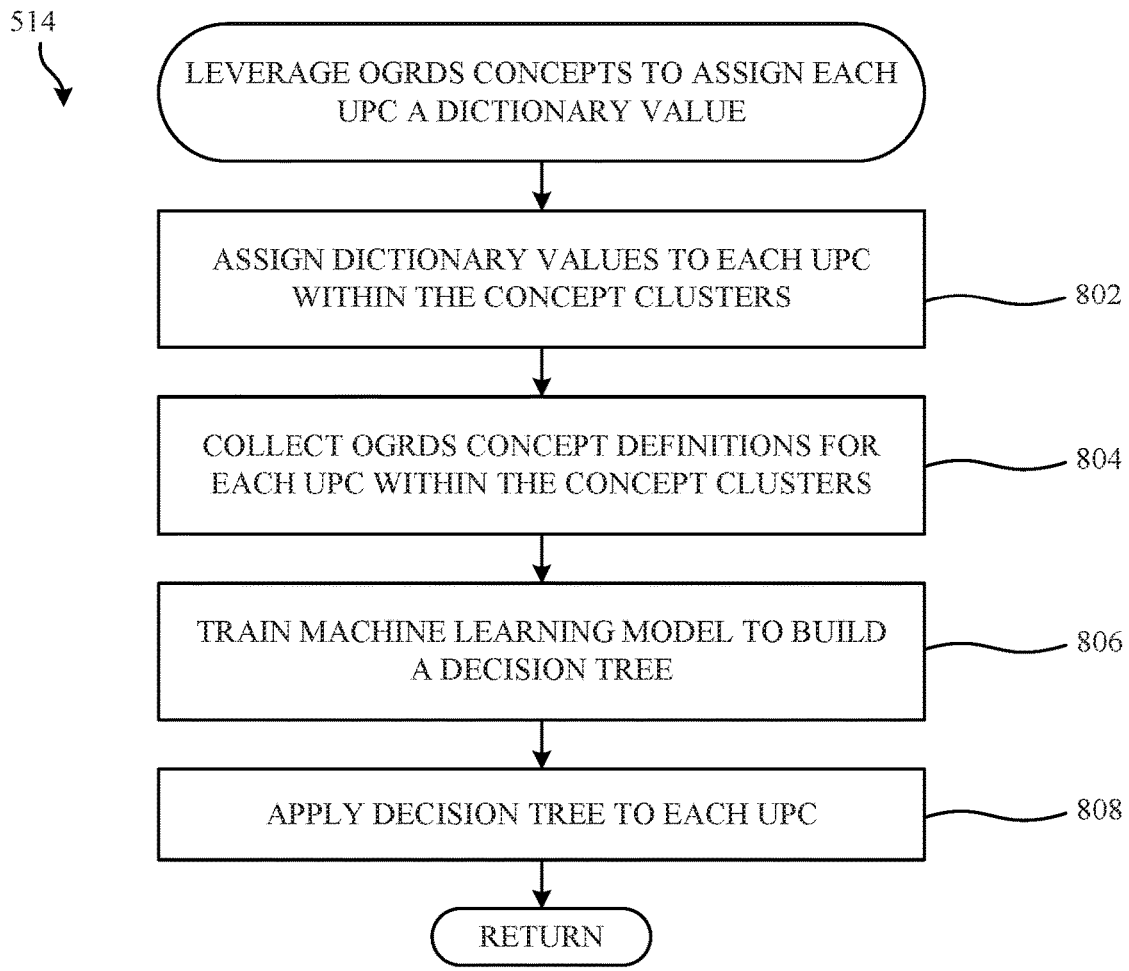

The flowchart of FIG. 8 is representative of example machine-readable instructions that may be executed to implement block 514 of FIG. 5. The example machine-readable instructions of FIG. 8 begin at block 802 at which the characteristic analyzer 116 assigns dictionary values to each UPC within the concept clusters. For example, the characteristic identifier 212 takes each UPC, within a concept cluster 308, 310, 312, 314, and assigns a dictionary value 336 to each UPC based on a majority vote. In such examples, because each UPC is associated with sub-clusters 340 that are defined by dictionary values 336, the characteristic identifier 212 can take a majority vote for each UPC to determine a dictionary value 336 to describe each UPC. In some examples, if the majority of dictionary values 336 associated with a UPC are the same dictionary value 336, then that dictionary value 336 is assigned to that UPC. In some examples, if the majority of dictionary values 336 associated with a UPC are not the same dictionary value 336, then no dictionary value 336 is assigned to that UPC. In some examples, UPCs that do not get assigned a dictionary value 336 are assigned dictionary values 336 later in the instructions of FIG. 8.

At block 804, the example characteristic identifier 212 collects OGRDS concept definitions for each UPC within the concept clusters 308, 310, 312, 314. For example, the characteristic identifier 212 retrieves OGRDS concept definitions from the reference database 108 for the UPCs within each concept cluster 308, 310, 312, 314. In such examples, the OGRDS concept definitions are UPC definitions that already exist within the reference database 108 and contain specific OGRDS characteristics. In such examples, the specific OGRDS characteristics can include a plurality of items that further describe each UPC.

At block 806, the example machine learning (ML) model trainer 214 trains a machine learning model to build a decision tree. For example, the ML model trainer 214 trains an ML model to learn the relationships between the UPC dictionary values and the specific ORGDS characteristics. In such examples, the learned relationships are constructed as a decision tree that allows for UPCs to fed through the decision tree to output a final dictionary value for the UPCs.

At block 808, the example machine learning (ML) model processor 216 applies the decision tree to each UPC. For example, the ML model processor 216 inputs UPCs into the decision tree. In some examples, the UPCs that did not get assigned a dictionary value 336 from the majority vote are fed into the decision tree by the ML model processor 216 to assign a final dictionary value. In some example, UPCs that already exist within the OGRDS can be fed into the decision tree to produce final dictionary values for those UPCs. In response to the UPCs that did not initially get assigned a dictionary value getting fed through the decision tree, the instructions of FIGS. 8 and 5 conclude and allow for the decision tree to be accessed through the user interface 114 of FIG. 1.

Figure 9:
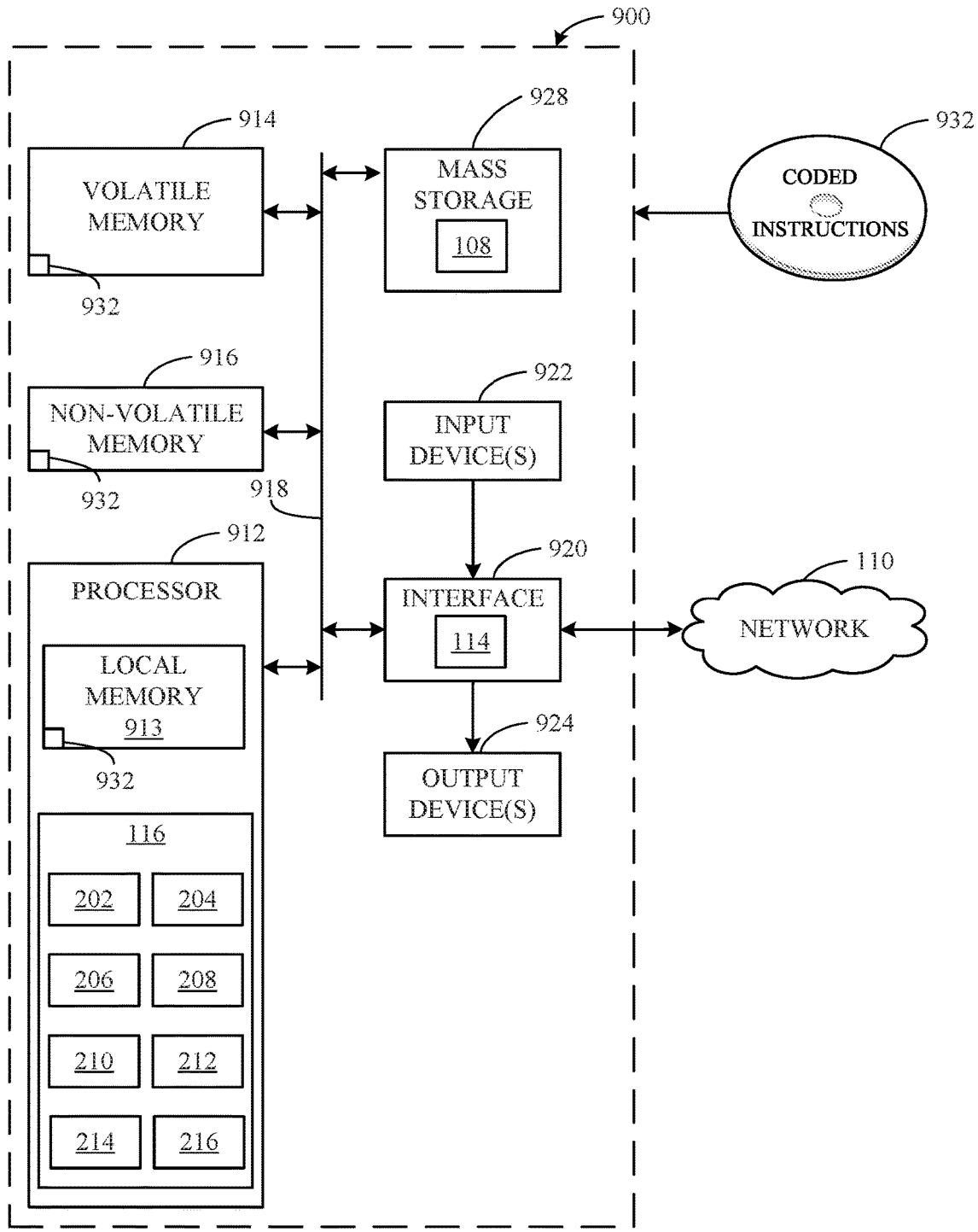
FIG. 9 is a block diagram of an example processing platform structured to execute machine readable instructions to implement the methods of FIGS. 5-8 and/or the example characteristic analyzer of FIGS. 1 and/or 2.

FIG. 9 is a block diagram of an example processor platform 900 structured to execute the instructions of FIGS. 5, 6, 7, and 8 to implement the characteristic analyzer 116 of FIGS. 1 and 2. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 912 implements the example file accessor 202, the example cluster identifier 204, the example graph builder 206, the example keyword analyzer 208, the example value normalizer 210, the example characteristic identifier 212, the example ML model trainer 214, and the example ML model processor 216.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 920 of the illustrated example, thus, typically includes a graphics driver card, a graphics driver chip, and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc. In the illustrated example of FIG. 9, the example interface 920 implements the example user interface 114.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

Figure 4:
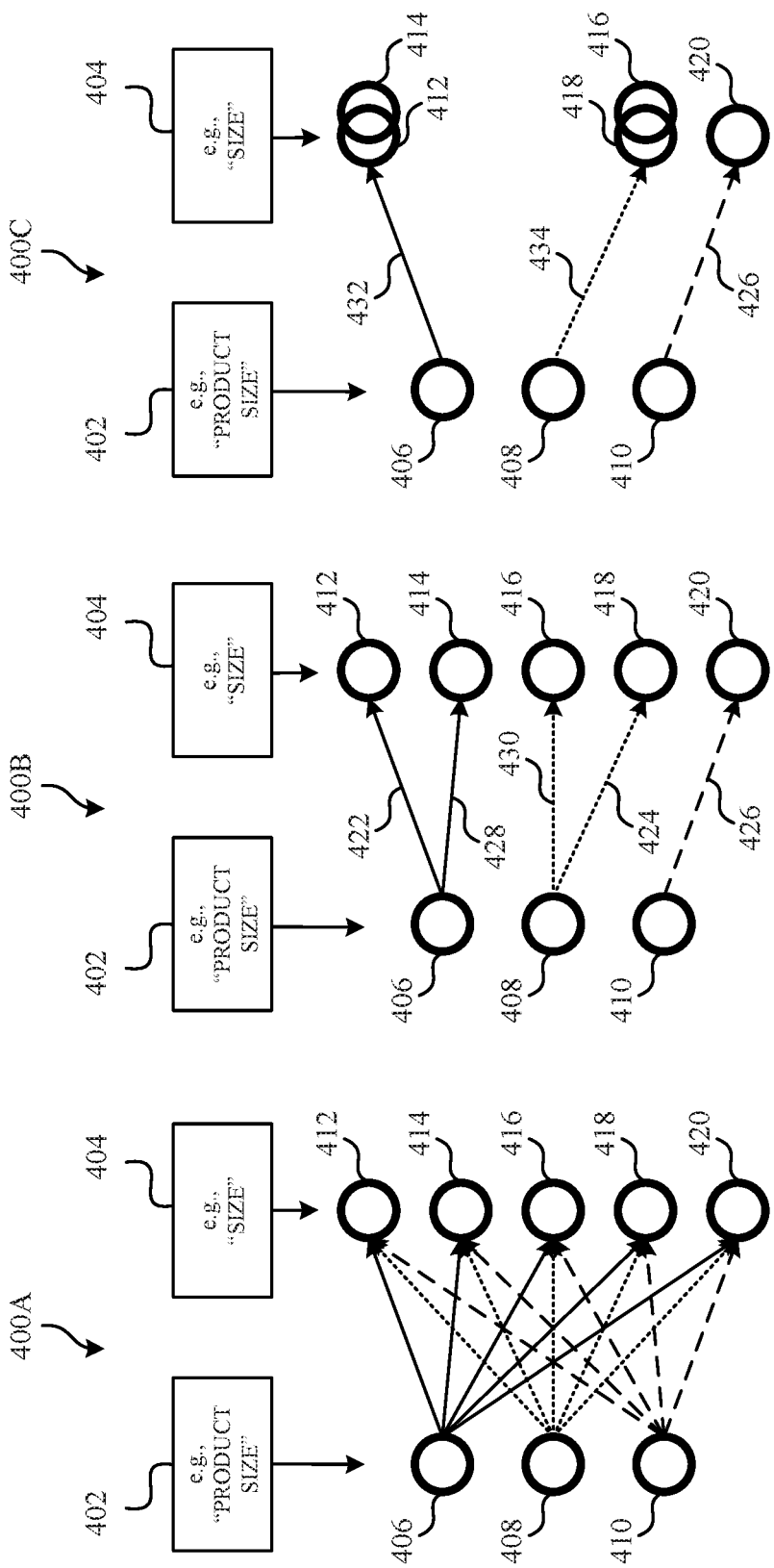
FIGS. 4A, 4B, and 4C are diagrams representative of an example graph matching process that implements an iterative process to create concept clusters.

The machine executable instructions 932 of FIGS. 4, 5, and 6 may be stored in the mass storage device 928, in the volatile memory 914, in the non-volatile memory 916, and/or on a removable non-transitory computer readable storage medium such as a CD or DVD. In the illustrated example of FIG. 9, the example mass storage device 928 implements the example reference database 108. In some examples, the example reference database 108 is separate from the processor platform 900.

From the foregoing, it will be appreciated that example methods and apparatus have been disclosed that map custom client specifications with standardized characteristics based on product similarities and dictionary values, developed through UPC overlap between custom characteristics and values. An iterative process to group custom characteristics into concept clusters is used to accurately and autonomously group relevant custom characteristics and values into clusters later used to create dictionary values. The disclosed methods and apparatus improve the efficiency of using a computing device by autonomously clustering and analyzing client specifications to provide a fast and accurate onboarding process. The disclosed methods and apparatus are accordingly directed to one or more improvement(s) in the functioning of a computer.

The following pertain to further examples disclosed herein. Example methods, apparatus, systems, and articles of manufacture to map client specifications with standardized characteristics are disclosed herein. Further examples and combinations thereof include the following:

Example 1 includes an apparatus to map client specifications with standardized characteristics, the apparatus comprising a cluster identifier to cluster client databases into client clusters based on a threshold quantity of overlapping universal product codes (UPCs) between respective ones of the client databases, a characteristic analyzer to identify custom characteristics from the respective ones of the client clusters, ones of the custom characteristics having dissimilar nomenclature, and a graph builder to cluster the ones of the custom characteristics based on a similarity metric, and normalize the ones of the custom characteristics as a proxy characteristic, the proxy characteristic having a common nomenclature to represent the ones of the custom characteristics, the characteristic analyzer to enable improved product marketing analysis by replacing dissimilar nomenclature with the proxy characteristic.

Example 2 includes the apparatus as defined in example 1, wherein the graph builder is to generate first nodes associated with UPCs having first ones of the custom characteristics, and generate second nodes associated with UPCs having second ones of the custom characteristics.

Example 3 includes the apparatus as defined in example 2, wherein the first ones of the custom characteristics have a first nomenclature, and the second ones of the custom characteristics have a second nomenclature different than the first.

Example 4 includes the apparatus as defined in example 2, wherein the graph builder is to generate a micro-similarity score between pairs of (a) the first nodes and (b) the second nodes.

Example 5 includes the apparatus as defined in example 4, wherein the graph builder is to generate the micro-similarity scores based on a threshold overlap of UPCs between the pairs of the first and second nodes.

Example 6 includes the apparatus as defined in example 4, wherein the graph builder is to apply Maximum Weighted Bipartite Graph Matching (MWBGM) to the first nodes and the second nodes, respective first ones of the second nodes paired with respective ones of the first nodes based on a relative maximum micro-similarity score, and respective second ones of the second nodes unpaired with the respective ones of the first nodes based on not satisfying the relative maximum micro-similarity score.

Example 7 includes the apparatus as defined in example 6, wherein the graph builder is to merge the second ones of the second nodes with respective ones of the first ones of the second nodes.

Example 8 includes a non-transitory computer readable medium including instructions, which when executed, cause at least one processor to, at least cluster client databases into client clusters based on a threshold quantity of overlapping universal product codes (UPCs) between respective ones of the client databases, identify custom characteristics from the respective ones of the client clusters, ones of the custom characteristics having dissimilar nomenclature, cluster the ones of the custom characteristics based on a similarity metric, normalize the ones of the custom characteristics as a proxy characteristic, the proxy characteristic having a common nomenclature to represent the ones of the custom characteristics, and enable improved product marketing analysis by replacing dissimilar nomenclature with the proxy characteristic.

Example 9 includes the non-transitory computer readable medium as defined in example 8, wherein the instructions, when executed, cause the at least one processor to generate first nodes associated with UPCs having first ones of the custom characteristics, and generate second nodes associated with UPCs having second ones of the custom characteristics.

Example 10 includes the non-transitory computer readable medium as defined in example 9, wherein the instructions, when executed, cause the at least one processor to identify first ones of the custom characteristics have a first nomenclature, and identify second ones of the custom characteristics have a second nomenclature different than the first.

Example 11 includes the non-transitory computer readable medium as defined in example 9, wherein the instructions, when executed, cause the at least one processor to generate a micro-similarity score between pairs of (a) the first nodes and (b) the second nodes.

Example 12 includes the non-transitory computer readable medium as defined in example 11, wherein the instructions, when executed, cause the at least one processor to generate the micro-similarity scores based on a threshold overlap of UPCs between the pairs of the first and second nodes.

Example 13 includes the non-transitory computer readable medium as defined in example 11, wherein the instructions, when executed, cause the at least one processor to apply Maximum Weighted Bipartite Graph Matching (MWBGM) to the first nodes and the second nodes, respective first ones of the second nodes paired with respective ones of the first nodes based on a relative maximum micro-similarity score, and respective second ones of the second nodes unpaired with the respective ones of the first nodes based on not satisfying the relative maximum micro-similarity score.

Example 14 includes the non-transitory computer readable medium as defined in example 13, wherein the instructions, when executed, cause the at least one processor to merge the second ones of the second nodes with respective ones of the first ones of the second nodes.

Example 15 includes a method to map client specifications with standardized characteristics, the method comprising clustering, by executing an instruction with at least one processor, client databases into client clusters based on a threshold quantity of overlapping universal product codes (UPCs) between respective ones of the client databases, identifying, by executing an instruction with the at least one processor, custom characteristics from the respective ones of the client clusters, ones of the custom characteristics having dissimilar nomenclature, clustering, by executing an instruction with the at least one processor, the ones of the custom characteristics based on a similarity metric, normalizing, by executing an instruction with the at least one processor, the ones of the custom characteristics as a proxy characteristic, the proxy characteristic having a common nomenclature to represent the ones of the custom characteristics, and enabling, by executing an instruction with the at least one processor, improved product marketing analysis by replacing dissimilar nomenclature with the proxy characteristic.

Example 16 includes the method as defined in example 15, further including generating first nodes associated with UPCs having first ones of the custom characteristics, and generating second nodes associated with UPCs having second ones of the custom characteristics.

Example 17 includes the method as defined in example 16, wherein the first ones of the custom characteristics have a first nomenclature, and the second ones of the custom characteristics have a second nomenclature different than the first.

Example 18 includes the method as defined in example 16, further including generating a micro-similarity score between pairs of (a) the first nodes and (b) the second nodes.

Example 19 includes the method as defined in example 18, further including generating the micro-similarity scores based on a threshold overlap of UPCs between the pairs of the first and second nodes.

Example 20 includes the method as defined in example 18, further including applying Maximum Weighted Bipartite Graph Matching (MWBGM) to the first nodes and the second nodes, respective first ones of the second nodes paired with respective ones of the first nodes based on a relative maximum micro-similarity score, and respective second ones of the second nodes unpaired with the respective ones of the first nodes based on not satisfying the relative maximum micro-similarity score.

Although certain example methods and apparatus have been disclosed herein, the scope of coverage of this patent is not limited thereto. On the contrary, this patent covers all methods and apparatus fairly falling within the scope of the claims of this patent.

What is claimed is:

1. An apparatus to map client specifications with standardized characteristics, the apparatus comprising:
    a cluster identifier to cluster client databases into client clusters based on a threshold quantity of overlapping universal product codes (UPCs) between respective ones of the client databases;
    a characteristic analyzer to identify custom characteristics from the respective ones of the client clusters, ones of the custom characteristics having dissimilar nomenclature; and
    a graph builder to:
        cluster the ones of the custom characteristics based on a similarity metric; and
        normalize the ones of the custom characteristics as a proxy characteristic, the proxy characteristic having a common nomenclature to represent the ones of the custom characteristics,
        the characteristic analyzer to enable improved product marketing analysis by replacing dissimilar nomenclature with the proxy characteristic.

2. The apparatus as defined in claim 1, wherein the graph builder is to:
    generate first nodes associated with UPCs having first ones of the custom characteristics; and
    generate second nodes associated with UPCs having second ones of the custom characteristics.

3. The apparatus as defined in claim 2, wherein the first ones of the custom characteristics have a first nomenclature, and the second ones of the custom characteristics have a second nomenclature different than the first nomenclature.

4. The apparatus as defined in claim 2, wherein the graph builder is to generate a micro-similarity score between pairs of (a) the first nodes and (b) the second nodes.

5. The apparatus as defined in claim 4, wherein the graph builder is to generate the micro-similarity scores based on a threshold overlap of UPCs between the pairs of the first and second nodes.

6. The apparatus as defined in claim 4, wherein the graph builder is to apply Maximum Weighted Bipartite Graph Matching (MWBGM) to the first nodes and the second nodes, respective first ones of the second nodes paired with respective ones of the first nodes based on a relative maximum micro-similarity score, and respective second ones of the second nodes unpaired with the respective ones of the first nodes based on not satisfying the relative maximum micro-similarity score.

7. The apparatus as defined in claim 6, wherein the graph builder is to merge the second ones of the second nodes with respective ones of the first ones of the second nodes.

8. A non-transitory computer readable medium including instructions, which when executed, cause at least one processor to, at least:
    cluster client databases into client clusters based on a threshold quantity of overlapping universal product codes (UPCs) between respective ones of the client databases;
    identify custom characteristics from the respective ones of the client clusters, ones of the custom characteristics having dissimilar nomenclature;
    cluster the ones of the custom characteristics based on a similarity metric;
    normalize the ones of the custom characteristics as a proxy characteristic, the proxy characteristic having a common nomenclature to represent the ones of the custom characteristics; and
enable improved product marketing analysis by replacing dissimilar nomenclature with the proxy characteristic.

9. The non-transitory computer readable medium as defined in claim 8, wherein the instructions, when executed, cause the at least one processor to:
generate first nodes associated with UPCs having first ones of the custom characteristics; and
generate second nodes associated with UPCs having second ones of the custom characteristics.

10. The non-transitory computer readable medium as defined in claim 9, wherein the instructions, when executed, cause the at least one processor to identify first ones of the custom characteristics have a first nomenclature, and identify second ones of the custom characteristics have a second nomenclature different than the first nomenclature.

11. The non-transitory computer readable medium as defined in claim 9, wherein the instructions, when executed, cause the at least one processor to generate a micro-similarity score between pairs of (a) the first nodes and (b) the second nodes.

12. The non-transitory computer readable medium as defined in claim 11, wherein the instructions, when executed, cause the at least one processor to generate the micro-similarity scores based on a threshold overlap of UPCs between the pairs of the first and second nodes.

13. The non-transitory computer readable medium as defined in claim 11, wherein the instructions, when executed, cause the at least one processor to apply Maximum Weighted Bipartite Graph Matching (MWBGM) to the first nodes and the second nodes, respective first ones of the second nodes paired with respective ones of the first nodes based on a relative maximum micro-similarity score, and respective second ones of the second nodes unpaired with the respective ones of the first nodes based on not satisfying the relative maximum micro-similarity score.

14. The non-transitory computer readable medium as defined in claim 13, wherein the instructions, when executed, cause the at least one processor to merge the second ones of the second nodes with respective ones of the first ones of the second nodes.

15. A method to map client specifications with standardized characteristics, the method comprising:
clustering, by executing an instruction with at least one processor, client databases into client clusters based on a threshold quantity of overlapping universal product codes (UPCs) between respective ones of the client databases;
identifying, by executing an instruction with the at least one processor, custom characteristics from the respective ones of the client clusters, ones of the custom characteristics having dissimilar nomenclature;
clustering, by executing an instruction with the at least one processor, the ones of the custom characteristics based on a similarity metric;
normalizing, by executing an instruction with the at least one processor, the ones of the custom characteristics as a proxy characteristic, the proxy characteristic having a common nomenclature to represent the ones of the custom characteristics; and
enabling, by executing an instruction with the at least one processor, improved product marketing analysis by replacing dissimilar nomenclature with the proxy characteristic.

16. The method as defined in claim 15, further including:
generating first nodes associated with UPCs having first ones of the custom characteristics; and
generating second nodes associated with UPCs having second ones of the custom characteristics.

17. The method as defined in claim 16, wherein the first ones of the custom characteristics have a first nomenclature, and the second ones of the custom characteristics have a second nomenclature different than the first nomenclature.

18. The method as defined in claim 16, further including generating a micro-similarity score between pairs of (a) the first nodes and (b) the second nodes.

19. The method as defined in claim 18, further including generating the micro-similarity scores based on a threshold overlap of UPCs between the pairs of the first and second nodes.

20. The method as defined in claim 18, further including applying Maximum Weighted Bipartite Graph Matching (MWBGM) to the first nodes and the second nodes, respective first ones of the second nodes paired with respective ones of the first nodes based on a relative maximum micro-similarity score, and respective second ones of the second nodes unpaired with the respective ones of the first nodes based on not satisfying the relative maximum micro-similarity score.

21. An apparatus comprising:
at least one memory;
instructions in the apparatus; and
processor circuitry to execute the instructions to:
cluster client databases into client clusters based on a threshold quantity of overlapping universal product codes (UPCs) between respective ones of the client databases;
identify custom characteristics from the respective ones of the client clusters, ones of the custom characteristics having dissimilar nomenclature;
cluster the ones of the custom characteristics based on a similarity metric;
normalize the ones of the custom characteristics as a proxy characteristic, the proxy characteristic having a common nomenclature to represent the ones of the custom characteristics; and
enable improved product marketing analysis by replacing dissimilar nomenclature with the proxy characteristic.

22. The apparatus as defined in claim 21, wherein the processor circuitry is to:
generate first nodes associated with UPCs having first ones of the custom characteristics; and
generate second nodes associated with UPCs having second ones of the custom characteristics.

23. The apparatus as defined in claim 22, wherein the processor circuitry is to identify first ones of the custom characteristics have a first nomenclature, and identify second ones of the custom characteristics have a second nomenclature different than the first nomenclature.

24. The apparatus as defined in claim 22, wherein the processor circuitry is to generate a micro-similarity score between pairs of (a) the first nodes and (b) the second nodes.

25. The apparatus as defined in claim 24, wherein the processor circuitry is to generate the micro-similarity scores based on a threshold overlap of UPCs between the pairs of the first and second nodes.

26. The apparatus as defined in claim 24, wherein the processor circuitry is to apply Maximum Weighted Bipartite Graph Matching (MWBGM) to the first nodes and the second nodes, respective first ones of the second nodes paired with respective ones of the first nodes based on a relative maximum micro-similarity score, and respective second ones of the second nodes unpaired with the respective ones of the first nodes based on not satisfying the relative maximum micro-similarity score.

27. The apparatus as defined in claim 26, wherein the processor circuitry is to merge the second ones of the second nodes with respective ones of the first ones of the second nodes.

* * * * *